DONALD T. STREET
Inventor

Patented Nov. 5, 1946

2,410,757

UNITED STATES PATENT OFFICE 2,410,757

OPTICAL PRISM SYSTEM

Donald T. Street, Rochester, N. Y., assignor to Bausch & Lomb Optical Company, Rochester, N. Y., a corporation of New York Application December 15, 1945, Serial No. 635,176

10 Claims. (Cl. 88—33)

This invention relates to optical instruments and more particularly to prismatic instruments and a prismatic reversing system therefor.

Prismatic reversing systems are generally employed in binocular instruments to deviate the light rays to cause a reversal of the image inverted by an objective so that the image of the object will appear erect and magnified to the eye of the observer. These systems also compact the path of the light rays in the instrument and thereby reduce the dimensions of the instrument without sacrificing the advantages realized by a relatively long optical path.

Heretofore, prismatic reversing systems have usually comprised at least four prisms with two or more of the prisms cemented to each other or the prisms have been held in spaced relation to each other in the instrument. Cemented prisms are objectionable, in that, the active faces of the prisms are difficult to accurately locate relative to each other in the cementing operation to secure their correct optical performance. Also, the formation of cement blisters between the located faces and the difficulty of maintaining the cement free from dust have further complicated this expensive operation. Where the prisms are held separated within the instrument, the many glass-to-air surfaces of the prisms reduce the brilliancy of the light by light losses and must be accurately ground and finished to prevent distortion of the image.

It has been suggested to form two or more of these prisms as an integral unit to reduce the number of glass-to-air surfaces, but the expense of accurately finishing a unitary prism with a large number of optically flat faces related to each other by angles having very small tolerance limits has been prohibitive to the economical manufacture of optical instruments. Whether the prisms be cemented or held separated within the instrument, considerable difficulty has been had in mounting the prisms in the instrument due to the shape of the prisms which required the use of straps, springs, or the like, to hold them within the instrument so that the prisms remained permanently in correct optical alignment.

The principal object of the present invention is to obviate these difficulties and disadvantages had in optical instruments employing prior prismatic reversing systems by providing a prism reversing system for optical instruments, and more especially binocular instruments, comprising two roof prisms of the Amici type having mutually cooperating reflecting faces causing a reversal of the images in their passages through the prism system. By the interaction of these faces of the prisms, the number of air-to-glass faces are reduced to an absolute minimum, thus insuring an increased brilliancy of the images with the least possible light losses. As only two prisms comprise the system for the instrument and each of the prisms has four reflecting faces, it is only necessary to accurately finish eight faces to insure the correct optical performance of the prism system when mounted in a binocular instrument. This permits a substantial saving to be effected in the cost of these instruments.

Also, the correct optical alignment of the prisms in the instrument may be readily secured, for it is only necessary to position the two prisms in the instrument in opposed relationship with the roof faces of the prisms outwardly disposed relative to each other and the other faces of the prisms inwardly disposed in spaced relation to each other. The accurate positioning and mounting of the prisms is further facilitated for, after thus positioning and holding the prisms, the triangular sides of the prisms may be cemented to the inner walls of a flat and hollow mounting body which may be die-cast or otherwise readily formed. By thus locating and mounting the prisms, the prisms are rigidly held in correct and permanent optical alignment within the instrument body. As the prisms may be readily mounted in the instrument and the instrument body is easily formed, substantial savings are further effected in the manufacturing costs of optical instruments.

Other objects and advantages of the present invention will appear from the following description taken in connection with the accompanying drawing, in which.

This application is a continuation-in-part of my co-pending application, Serial No. 511,978 filed November 27, 1943.

Figure 1:
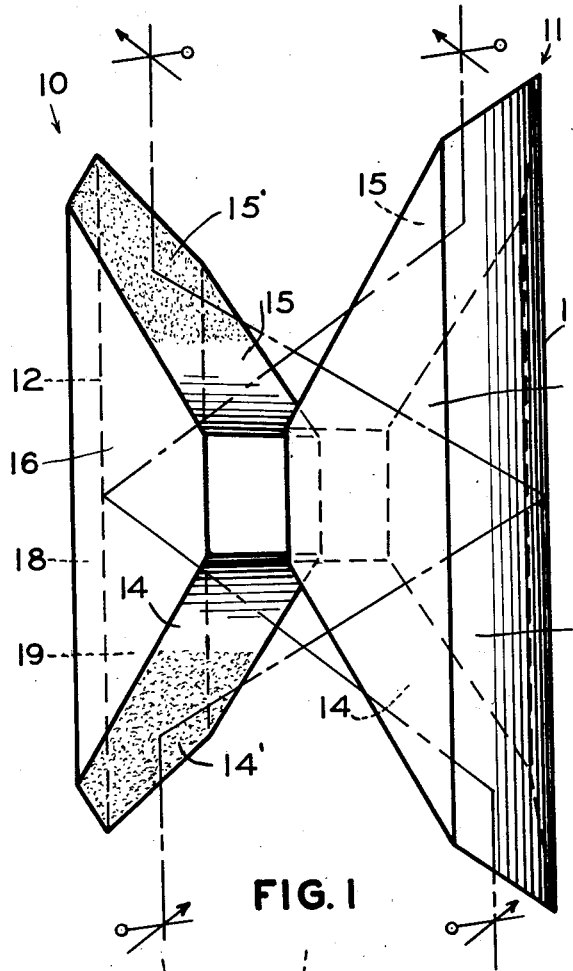
Fig. 1 is a perspective view of the prismatic reversing system of the present invention.

The prismatic reversing system of the present invention, as illustrated in the drawing and more particularly in Fig. 1, comprises two opposed roof prisms 10 and 11 of the Amici type with the respective roofs 12 and 13 of the prisms outwardly disposed and the lower inner or entrance faces 14 and the upper inner or exit faces 15 of the prisms angularly disposed to each other, the substantially triangular sides 16 and 17 of each prism being parallel to each other.

Each of the prisms is made from a single block of glass and apart from the roof faces, has only two optically flat faces, which are the entrance face 14 and the exit face 15. The prisms are similarly formed with the faces 14 and 15 of each prism angularly disposed 30° to the roof edge and 120° to each other. The roof faces 18 and 19 of each prism are at right angles to each other and therefore angularly disposed at an angle of 90°. Coatings of reflecting material, such as distilled rhodium or aluminum, are deposited on portions of the surfaces 14 and 15 as shown at 14' and 15'. Such layers are opaque and extend over approximately the lower two-thirds of surface 14 and upper two-thirds of surface 15 so that the reflecting layers do not interfere with the passage of light rays through the other portions of surfaces 14 and 15.

In the position of the prisms 10 and 11 shown in perspective in Fig. 1, the roof edges are parallel to each other and therefore a beam of light, indicated by a dot-dash line and parallel to the roof edge of the prism 10, is reflected by the reflecting layer 14' on plane face 14 of the prism 10 to the prism 11. The beam of light passes normal to and through the plane face 14 of the prism 11 and is twice reflected by the roof faces 18 and 19 of this prism. As the beam is reflected from the roof of the prism 11 normal to the plane reflecting face 15 of the prism 11, it passes therethrough and is angularly deviated by the reflecting layer 15' on plane face 15 of the prism 10 to emerge in alignment with the path of the entering beam.

In like manner, the beam angularly incident on the reflecting layer 14' on face 14 of the prism 11 is reflected through the face 15 of the prism 10 to the roof of the prism 10. The roof of the prism 10 twice reflects the beam and it passes through the face 15 of the prism 10 to the reflecting layer on face 15 of the prism 11. As the face 15 of the prism 11 is angularly disposed sufficiently to reflect the beam, the beam is reflected and emerges in alignment with its path of entrance. It can now be seen that the mutually cooperative reflecting faces of the prism system will deviate each beam of light incident on the entrance faces 14 and emergent from the exit faces 15 of the prisms by four reflections to cause the images to be completely reversed as shown in Fig. 1.

Figure 2:
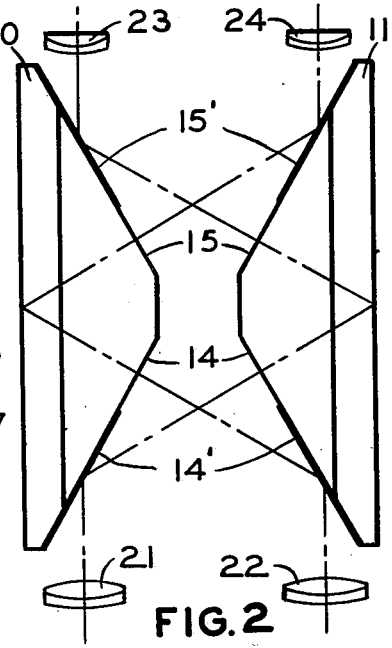
Fig. 2 is a diagrammatic view of a binocular telescope constructed in accordance with my invention.

Referring to Fig. 2, there is diagrammatically shown the prismatic reversing system of the present invention embodied in a binocular telescope, wherein the prisms 10 and 11 are disposed between the objectives 21 and 22 and the oculars 23 and 24. It will be readily apparent that the prismatic reversing system will cause a beam of light axially entering the objective 21 parallel to the roof edge of the prism 10 to be reflected by the prism 10 to the prism 11 and then reflected by the prism 11 back to the prism 10 to emerge therefrom axially of the ocular 23. Also, the beam of light axially entering the objective 21 is similarly reflected by the prisms 10 and 11 to emerge therefrom axially of the ocular 24. In this manner, by the interaction of the prisms, the images formed by the objectives will be completely reversed upon emergence from the prismatic reversing system. The length of the optical path of each beam in the system permits objectives of long focal length to be used to insure a high degree of magnification of the object without the disadvantages attendant in using short focus oculars. As a result, the objectives may be manufactured with a greater radius of curvature which effects a substantial saving in the manufacturing costs of binocular telescopes. As it is only necessary to position the opposed prisms in the instrument with their roof faces outwardly disposed and in parallel planes to insure the correct location of the reflecting faces of the prisms, the prisms may be readily mounted in a single flat and hollow instrument body for the triangular sides of the prisms may be cemented to the inner walls of the body. Also, the flat and compact body of the instrument permits the convenient use and ready handling of the instrument and the instrument is pleasing in appearance.

Figure 3:
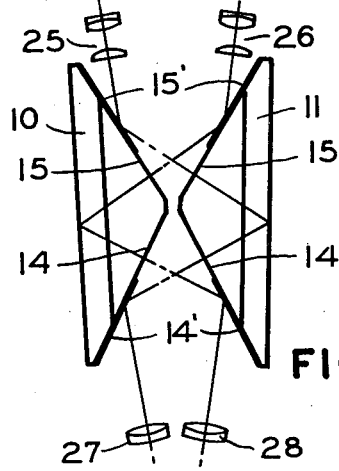
Fig. 3 is a diagrammatic view of a binocular microscope constructed in accordance with my invention.

In Fig. 3, there is diagrammatically shown the prismatic reversing system of the present invention embodied in a binocular microscope wherein 10 and 11 indicate the prisms disposed between the oculars 25 and 26 and the objectives 27 and 28 of the microscope. Each of the objectives 27 and 28 are angularly disposed to each other to focus on an object held by a suitable stage (not shown). To deviate the respective beams shown as axially traversing the objectives so that the emergent beams will issue axially of the angularly inclined oculars 25 and 26, the prisms 10 and 11 have their roof edges angularly inclined to each other to reduce the angle subtended by the lower inner faces of the prisms and enlarge the angle subtended by the upper inner faces of the prisms. By thus positioning the prisms, the respective diverging beams of light axially traversing the objectives 27 and 28 will strike the lower reflecting faces of these prisms and be reflected by the prism system to divergingly emerge from the upper reflecting faces of the prisms in the respective axes of the angularly disposed oculars 25 and 26. The images formed by the beams of light traversing the objectives will be reversed by the prism system and will pass to the oculars 25 and 26.

Figure 4:
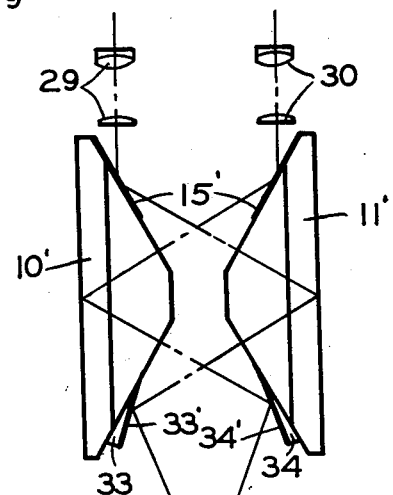
Fig. 4 is a diagrammatic view of a modified binocular microscope constructed in accordance with my invention.

Referring to Fig. 4, there is diagrammatically shown a modification of the prismatic reversing system of the present invention embodied in a binocular microscope wherein 10 and 11 indicate the prisms disposed between the oculars 29 and 30 and the objectives 31 and 32 of the microscope. Each of the objectives 31 and 32 are angularly disposed to each other to focus on an object held by a suitable stage (not shown). To deviate the respective beams shown as axially traversing the objectives so that the emergent beams will issue parallel to the roof edges of the prisms and axially of the parallel oculars 29 and 30, wedge prisms 33 and 34 are cemented to the lower inner faces of the prisms 10 and 11, one of the isosceles faces of the wedge prisms being cemented to the face of the prisms 10 and 11 and the other face being disposed at an angle greater than the critical angle to the beam of light transmitted through the objective. The outer faces of wedge prisms 33 and 34 are coated with opaque layers of reflecting material, indicated at 33' and 34'. Such reflecting layers may, for example, be formed of distilled rhodium, aluminum, or other suitable material. It will therefore be apparent that, as the roof edges of the prisms are parallel, a beam of light traversing the objective 31 will be reflected by the reflecting layer 33' of the wedge prism 33 to the roof of the prism 11'. The beam is then reflected by the roof to the upper inner face of the prism 10' from whence it is reflected to the ocular 29 by the reflecting layer 15'. In like manner, the beam of light from the objective 32 is reflected by the reflecting layer 34' of wedge prism 34, cemented to the prism 11', to the roof of the prism 10'. The roof of this prism then reflects the beam to the reflecting layer 15' on the upper inner face of the prism 11' which angularly deviates the beam to the ocular 30. In this manner, the image formed by each of the objectives will be completely reversed after emergence from the prism system.

It will be apparent that, although it is preferable to form the roof prisms 10' and 11' and the wedge prisms 33 and 34 separately and then cement the wedge prisms 33 and 34 to the lower inner faces of the prisms 10' and 11', respectively, each of the composite elements of the system, comprising a roof prism and a wedge prism, may be formed of a single piece of glass having their effective faces ground so that geometrically speaking they are the same and functionally equivalent to those of the system shown in Fig. 4.

It will be apparent that binocular microscopes embodying the prismatic reversing system of the present invention will stereoscopically enable the observer to form a magnified three-dimensional picture of the object space. As a result, the microscopes permit long periods of observation with little fatigue and give a stereoscopic image extremely useful in examining many objects.

It will be observed that in the embodiments of the prismatic reversing system shown in Figs. 2, 3, and 4, several structural and operative advantages are gained. The number of air-to-glass faces are reduced to a minimum, insuring the increased brilliance of the images by decreasing light losses. As the path of the rays is of considerable length from the objectives to the oculars, lenses of long focal length may be employed to insure a high degree of magnification without distortion of the image. As the prism system comprises only two mutually cooperating prisms having a minimum number of eight faces to be accurately finished to obtain a complete reversal of the images, the prism system may be economically manufactured. Also, as the prisms may be readily located and held in an easily formed instrument body, further savings are realized in the manufacturing costs of prismatic instruments.

From the foregoing, it will be apparent that I am able to attain the objects of my invention and provide a new and improved prismatic reversing system for prismatic instruments which is efficient in operation and relatively simple and inexpensive to manufacture. Various modifications can, of course, be made without departing from the spirit of my invention or the scope of the appended claims.

I claim:

1. A prismatic reversing system comprising a pair of spaced, oppositely positioned roof prisms each having a roof portion comprising mutually cooperating reflecting faces for reversing similar images, each of said prisms having entrance and exit faces angularly disposed relative to each other and to the roof of an opposed prism, said prisms being positioned with their entrance and exit faces in opposed relation so that incoming light rays incident on an entrance face of either of the prisms are reflected to the roof of the other prism and reflected by the last-named roof to the exit face of the first-named prism, said last-named face reflecting the light outwardly of the prism system.

2. A prismatic reversing system comprising a pair of spaced, oppositely positioned roof prisms each having a roof portion comprising mutually cooperating reflecting faces for reversing similar images, each of said prisms having entrance and exit faces angularly disposed relative to each other and to the roof of an opposed prism, said prisms being positioned with their entrance and exit faces in opposed relation so that incoming light rays incident on an entrance face of either of the prisms are reflected to the roof of the other prism and reflected by the last-named roof to the exit face of the first-named prism, said last-named face reflecting the light outwardly of the prism system, the remotely positioned portions of the entrance and exit faces of each prism carrying opaque reflecting layers for increasing the reflectivity of such portions of the faces.

3. A binocular instrument comprising two objectives, two oculars having their axes parallel with the axes of said objectives, and a prismatic reversing system disposed between said objectives and said oculars, said system comprising a pair of opposed similar roof prisms of the Amici type, each prism of the pair having a reflecting face for reflecting incoming light from an objective to the other prism and the latter prism successively reflecting the light received from said first-named prism back to the first-named prism, the first-named prism also having a second reflecting face for reflecting the light outwardly to an ocular.

4. A binocular telescope comprising a pair of objectives, a pair of oculars having their axes parallel with the axes of said objectives, and a prismatic reversing system, said system comprising a pair of opposed roof prisms of the Amici type disposed between said objectives and oculars, each of said prisms having an entrance face angularly disposed to the axis of an objective for reflecting light received therefrom, a roof disposed parallel to the axes of said objectives and said oculars for receiving the reflected light from the entrance face of an opposed prism; and an exit face angularly disposed to the axis of an ocular for receiving light from the roof of the opposed prism, said exit face reflecting the light to an ocular.

5. A binocular telescope comprising a pair of objectives, a pair of oculars, a prismatic reversing system disposed between said objectives and said oculars, said system comprising two spaced and opposed roof prisms of the Amici type, the longitudinal axes of which are parallel to each other and to the axes of said objective and said oculars, each of said prisms having an entrance face angularly disposed to an objective for reflecting light received therefrom; an exit face angularly disposed to an ocular for reflecting light thereto, and a roof receiving light from an entrance face of an opposed prism and reflecting the light to the exit face of the opposed prism.

6. A binocular microscope comprising two spaced objectives, two spaced oculars having their axes angularly disposed to the axes of said objectives, a prismatic reversing system located between said objectives and said oculars, said system comprising two spaced, opposed roof prisms having their longitudinal axes parallel to the axes of said oculars and to each other, each of said prisms having an entrance face angularly disposed to an objective for reflecting light received therefrom, each prism having a roof receiving light from the entrance face of an opposed prism and reflecting the light, and an exit face on each prism angularly disposed to an ocular for reflecting light received from the roof of an opposed prism to an ocular, said prisms being positioned with their entrance and exit faces in opposed relation.

7. A binocular microscope comprising two objectives, two oculars having their axes angularly disposed to the axes of the objectives and to each other, a prismatic reversing system disposed between said oculars and said objectives, said system comprising two similar opposed prisms having their longitudinal axes inclined to each other and to the objectives and oculars, each of said prisms having an entrance face angularly disposed to an objective for reflecting incoming light therefrom, each prism having an exit face angularly disposed to an ocular for reflecting light to the ocular, and each prism having a roof receiving light reflected from the entrance face of an opposed prism and successively reflecting the light and directing it to the exit face of the opposed prism, the prisms being positioned with their entrance and exit faces in opposed relation.

8. A binocular microscope comprising two objectives, two oculars having their axes angularly disposed to the axes of the objectives and to each other, a prismatic reversing system disposed between said oculars and said objectives, said system comprising two similar opposed roof prisms, each of said prisms having a roof facing outwardly and angularly inclined to each other, each prism having an entrance face angularly disposed to an objective and receiving light therefrom to reflect the light to the roof of the opposed prism, and each prism having an exit face angularly disposed to an ocular for reflecting light received from the roof of the opposed prism and reflecting the light to an ocular.

9. An optical system comprising a pair of spaced similar prisms, each prism having upper and lower inclined faces forming equal angles with the vertical and positioned, respectively, in intersecting planes, each prism also having internal reflecting faces meeting to form a roof portion, each of said planes intersecting the planes of said reflecting faces, said prisms being symmetrically positioned with the corresponding inclined faces opposite each other and with the roof portions remote from each other, whereby a light ray striking a lower face of the first prism will be reflected through the lower face of the second prism, thence be successively reflected by the roof portion and directed onto the upper face of said first prism and thence reflected vertically.

10. An optical system comprising a pair of spaced similar prisms, each prism having entrance and exit reflecting faces positioned, respectively, in planes which intersect at an angle of substantially 120°, each prism also having internal reflecting faces meeting to form a roof portion, the planes of the internal reflecting faces intersecting the first-named planes, said prisms being symmetrically positioned with the corresponding entrance and exit faces opposite each other and with the roof portions remote from each other whereby a light ray striking the entrance face of the first prism will be reflected to the roof portion of the second prism, then successively reflected by the roof portion of the second prism and directed onto the exit face of the first prism and thence reflected outwardly from the system.

DONALD T. STREET.